T. APPLEBY AND L. M. KNOLL.
RADIO APPARATUS.
APPLICATION FILED JUNE 14, 1919.
1,365,579.
Patented Jan. 11, 1921.
3 SHEETS—SHEET 1.
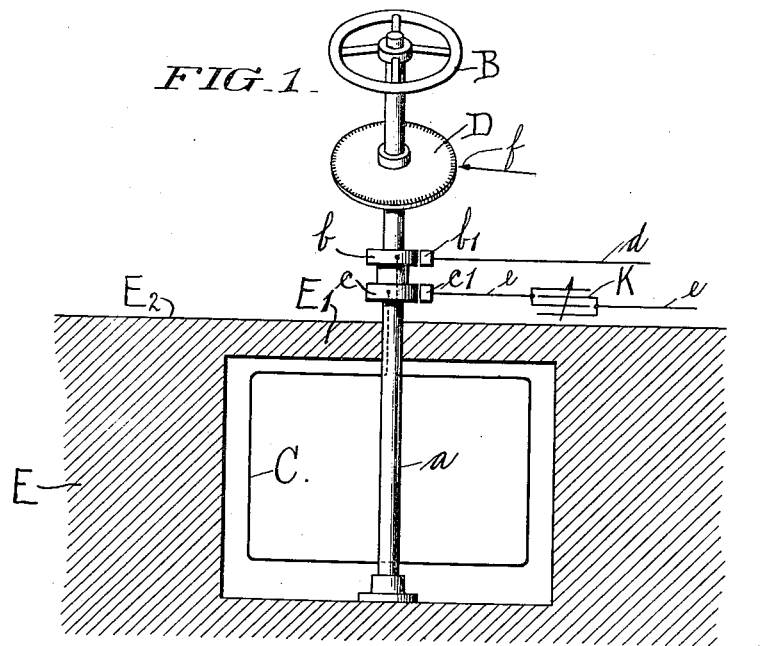
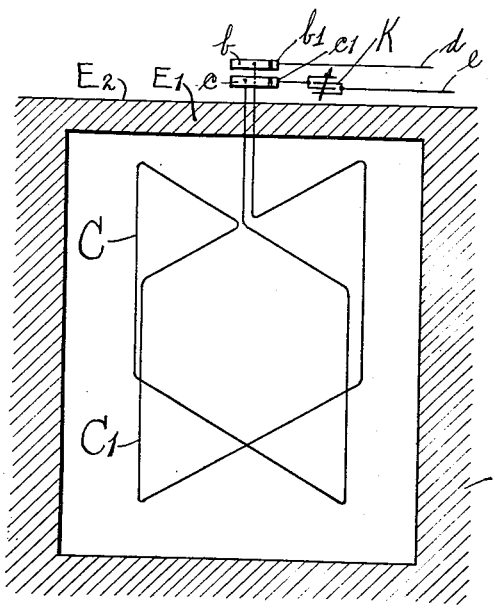
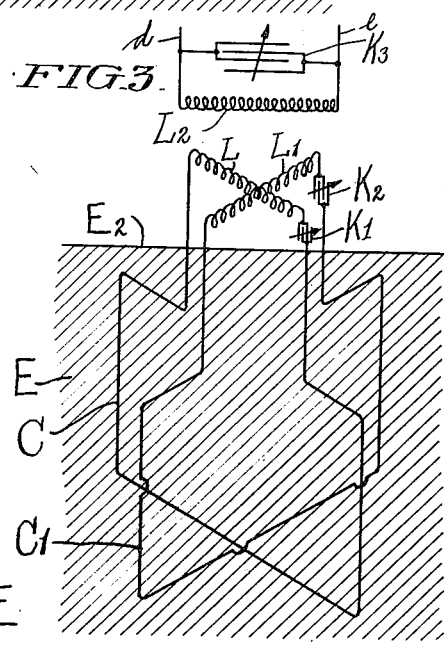
INVENTOR
Thomas Appleby and
Lloyd M. Knoll
BY
Cornelius D. Ehret
their ATTORNEY.

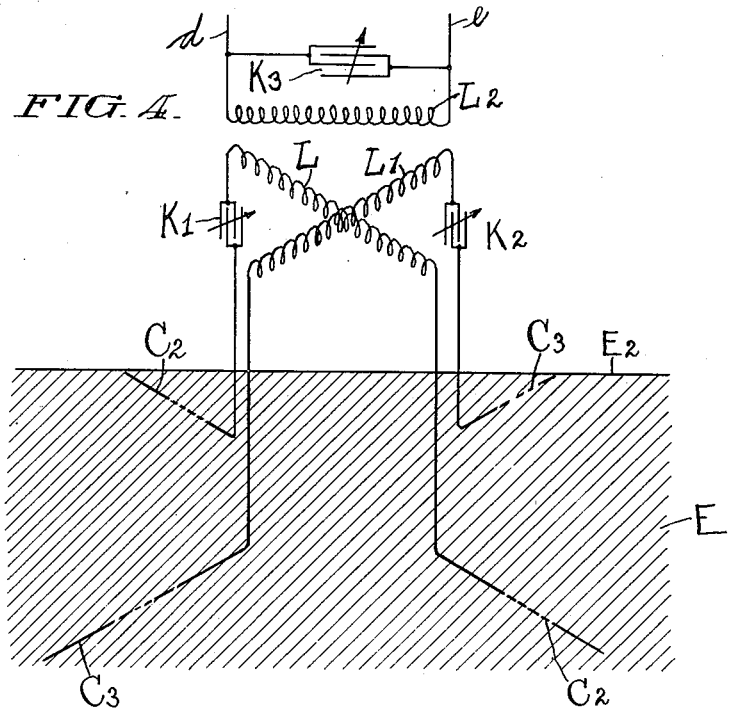
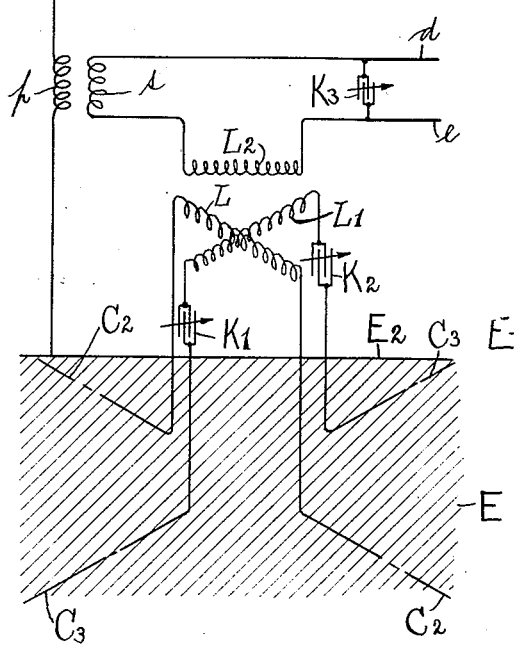
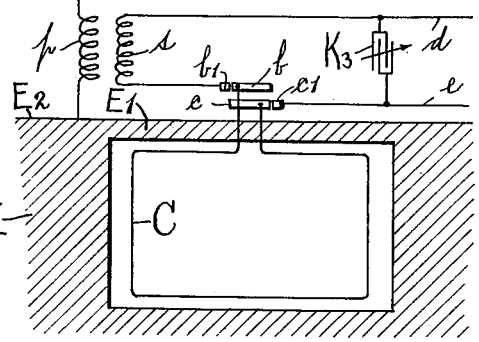

UNITED STATES PATENT OFFICE.

THOMAS APPLEBY AND LLOYD M. KNOLL, OF PHILADELPHIA, PENNSYLVANIA, ASSIGNORS OF ONE-THIRD TO CORNELIUS D. EHRET, OF PHILADELPHIA, PENNSYLVANIA.

RADIO APPARATUS.

1,365,579.

Specification of Letters Patent.   Patented Jan. 11, 1921.

Application filed June 14, 1919. Serial No. 304,118.

*To all whom it may concern:*

Be it known that we, THOMAS APPLEBY and LLOYD M. KNOLL, citizens of the United States, residing in the city and county of Philadelphia, State of Pennsylvania, have invented certain new and useful Improvements in Radio Apparatus, of which the following is a specification.

Our invention relates to the transmission of high frequency energy, as electro-radiant energy, through the natural media for purposes of signaling, transmission of intelligence or messages, or for any other purpose.

Our invention resides in both transmitting and receiving apparatus for purposes of the character referred to, particularly for procuring directive effects and for preventing interference or other disturbances.

More particularly our invention resides in apparatus of the character referred to in which a part or the entire radiating or absorbing structure is more or less completely surrounded by a natural medium other than air, as for example, the earth or water; or such radiating or absorbing structure may be entirely or in part similarly more or less completely inclosed in a suitable screen or cage having the same or similar effects as the earth or water.

In connection with receiving apparatus employed as a radio compass because of directive effects as obtained, for example, by a rotatable absorbing coil structure, the accuracy of determination of direction of a source of radiant energy is sometimes materially interfered with by objects as conducting masses, or earth formations near the absorbing structure, with resultant distortion of the electric or magnetic field, or both, causing a variation of the determined direction from the true direction. By employment of our invention, however, the disturbing effects of distortion are materially reduced. And irrespective of distortion effects the critical maximum or minimum response in the receiving apparatus are more sharply defined whereby when the apparatus is so suitably shielded its directional or compass properties are improved.

Our invention resides also in multiplex apparatus of the character hereinafter described.

For an illustration of some of the many forms our structure may take, reference is to be had to the accompanying drawings, in which:

Figure 1 is a view, partly diagrammatic, of apparatus comprising a rotatable absorbing or radiating coil inclosed or screened by the earth or equivalent.

Fig. 2 is a similar view of a modified form where two rotatable coils at an angle to each other are employed.

Fig. 3 is a diagrammatic view of apparatus involving stationary radiating or absorbing coils at an angle to each other buried in the earth or otherwise screened.

Fig. 4 is a diagrammatic view of absorbing or radiating conductors disposed at an angle to each other and buried in the earth or similarly screened.

Fig. 5 is a view of apparatus comprising stationary absorbing or radiating structure buried in the earth or similarly screened in coöperation with absorbing or radiating structure disposed above the earth or outside of the screening structure.

Fig. 6 is a view of a rotatable radiating or absorbing coil structure buried in the earth or similarly screened in association with radiating or absorbing structure above the earth or external to the screening means.

Figure 7:
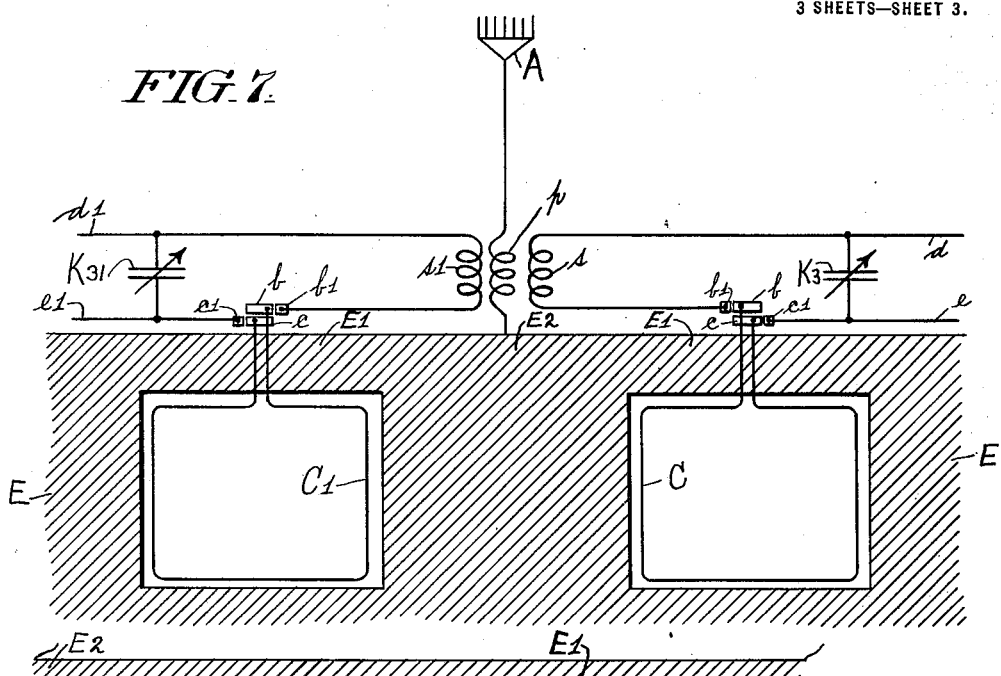
Fig. 7 is a diagrammatic view illustrating multiplex apparatus.

Referring to Fig. 1, E represents the earth, water or equivalent screening or shielding means within which is buried or disposed a coil C of any suitable number of turns, rotatable by the shaft $a$ about a vertical axis whereby the plane of the coil C may be caused to point in any direction. The terminals of the coil C terminate in the slip rings $b$, $c$, with which coöperate the brushes $b_1$, $c_1$, connected to the conductors $d$ and $e$, with which may be associated the variable tuning condenser or capacity K, the conductors $d$ and $e$ connecting to any suitable receiving apparatus, as audion or thermionic detectors and amplifiers, when the apparatus is used as a radio compass or direction finder, or to any suitable source of high frequency oscillations when the apparatus is to be used for transmitting. Carried by the shaft $a$ is the compass scale or card D, with which coöperates a stationary pointer $f$, the shaft $a$ and therefore the coil C and compass card D being rotatable by the hand wheel B.

When the apparatus is used as a radio compass, for example the shaft $a$ is rotated until the coil C assumes that position giving either maximum, minimum or other critical response in the receiving apparatus to thereby determine the direction of a source of radiant energy located, for example, upon a ship which is steering into a harbor at or in the vicinity of which the coil C is installed.

It has been found that where such a radio compass is installed near masses of conducting material, or near unsymmetrical earth formations as a hill or cliff, a distortion of the electric or magnetic fields, or both, takes place, with the result that for critical response in the receiving apparatus the plane of the coil C will not coincide truly with the plane in which the source of radiant energy is disposed. However, by locating the absorbing structure in such position that it is wholly or largely surrounded by the earth or equivalent, the errors introduced by the aforesaid distortion are materially reduced.

While we have shown the absorbing structure C entirely surrounded by earth or equivalent, even by the covering portion $E_1$, it will be understood that improved effects will be obtained even without such covering material; furthermore, the absorbing structure C may even project more or less above the earth's surface, though it is preferred that it be entirely beneath the surface $E_2$.

In Fig. 2 the absorbing structure comprises two coils C and $C_1$, each of any suitable number of turns, disposed at an angle with respect to each other and rotatable as in the case of Fig. 1. The coils C, $C_1$ are shown connected in series with each other, though it will be understood they may be connected in parallel. Here again any suitable transmitting or receiving apparatus may be associated with the coil structure C, $C_1$, which may be either a radiating or absorbing structure.

In Fig. 3 the coils C and $C_1$ are stationary and buried or to a large part disposed in the earth E or equivalent, with their planes at an angle with respect to each other. In series with the coil C is connected a variable inductance L and variable capacity $K_1$; and in series with the coil $C_1$ is a variable inductance or coil $L_1$ and a variable capacity $K_2$. Thus the coil circuits may be tuned to the energy to be absorbed or transmitted. The coils L, $L_1$ are placed at an angle with each other, preferably at an angle equal to the angle between their coils C, $C_1$. In inductive relation to both coils L, $L_1$ is disposed a rotatable adjustable coil or inductance $L_2$ whose circuit may be tuned by the variable capacity $K_3$. When the apparatus is used as a direction finder or directionally selective receiver, there is associated with the coil $L_2$ and condenser $K_3$ a suitable detecting apparatus, the coil $L_2$ being rotated with respect to the stationary coils L and $L_1$ until a maximum or minimum response is obtained, whereupon the direction of the axis of the coil $L_2$ is then an indication of the direction of the source of radiant energy. While two coils C and $C_1$ are shown, it will be understood also that our invention comprises the use of only one of them, or of more of them.

In Fig. 4 in lieu of closed coils there are buried in the earth E or equivalent one or more insulated conductors $C_2$ and $C_3$ disposed at an angle with respect to each other; and in series with these conductors are the adjustable inductances and condensers L, $K_1$ and $L_1$, $K_2$, and adjustable inductance or coil $L_2$ being rotatable with respect to the inductances L, $L_1$ as described in connection with Fig. 3. With the inductance $L_2$ is associated the tuning condenser $K_3$. Here again either for absorption or radiation a directive effect is obtained, the detecting apparatus being associated with condenser $K_3$ and inductance $L_2$ for reception or direction finding, or upon them may be impressed oscillations generated by any suitable source for transmitting purposes.

In Fig. 5 the arrangement is substantially similar to that of Fig. 4 so far as concerns one or more conductors $C_2$ and $C_3$, inductances L, $L_1$, $L_2$ and condensers $K_1$, $K_2$ and $K_3$. In series or otherwise suitably associated with the rotatable inductance $L_2$ and the condenser $K_3$ is a secondary $s$ of an oscillation transformer whose primary $p$ is in series with the antenna A connected to earth E or to any other suitable capacity. When the apparatus is used for reception as direction finding, the receiving apparatus connected to the conductors $d$ and $e$ is subjected to the conjoint effects of the buried conductors $C_2$ and $C_3$ as well as the effects produced in the aerial A, the aerial and all circuits preferably being attuned to the frequency of the received energy. By this combination the accuracy of determining direction is improved, the burying or equivalent shielding of the conductors $C_2$ and $C_3$ assisting in preventing effects of distortion.

In Fig. 6 the antenna is associated with a coil structure C of any suitable number of turns, which is preferably rotatable as described in connection with Fig. 1, the coil C and the antenna A coöperatively affecting the receiving apparatus connected to the receiving conductors $d$ and $e$. The coil structure C may be of any suitable number of turns and may be fixed or stationary, or may comprise coils fixed or stationary as in Figs. 2 and 3.

In both the cases of Figs. 5 and 6 the apparatus may be employed for direction finding or reception in general, or for directional transmitting by impressing upon both the antenna structure and the buried or shielded structure high frequency oscillations from any suitable source.

In arrangements such as indicated in Figs. 5 and 6, wherein in addition to directive transmitting or receiving structure there is employed in coöperation an antenna structure, the entire combination has uni-lateral characteristics in that in a direction opposite to that in which maximum transmitting and receiving effects are possible the transmitting and receiving effects are zero. In these combinations the burying or shielding of the directive elements, as conductors $C_2$, $C_3$ of Fig. 5 and coil or coils C of Fig. 6, does not interfere with the uni-lateral characteristics, but increases the capacity of the apparatus as an entirety sharply to determine direction, either for transmitting or receiving, in addition to the advantage gained in eliminating or reducing distortion effects.

With uni-lateral arrangements of the character indicated in connection with Figs. 5 and 6, multiplex reception or transmission is readily effected by associating with the antenna any suitable number of shielded or buried structures each utilizable for a different direction of reception or transmission when coöperating with the antenna. In this connection each of the buried or shielded structures may have its own separate and distinct coupling, like $p$, $s$, with the co-operating antenna. Thus, messages from a plurality of transmitting stations located in different directions from the receiving apparatus such as shown in Figs. 5 and 6 may be simultaneously received in the aforementioned multiplex arrangement because as to each of such transmitting stations a different uni-lateral maximum reception is possible at the receiving station. Such multiplex apparatus is indicated in Fig. 7, wherein two shielded radiating or absorbing structures, as rotatable coils C and $C_1$, co-act with the same antenna structure A, which latter is coupled to them by the primary $p$ and secondaries $s$ and $s_1$. With the secondary $s$ are associated the condenser $K_3$ and connecting conductors $d$ and $e$; while with the secondary $s_1$ are associated the variable condenser $K_{31}$ and the connecting conductors $d_1$ and $e_1$.

In arrangements of all of the characters herein described the burying or shielding of absorbing or transmitting structure in addition to lessening the effects of distortion as described, more sharply defines the critical maximum or minimum responses in the receiving apparatus and more sharply defines the direction of maximum radiation in transmitting apparatus.

Figure 8:
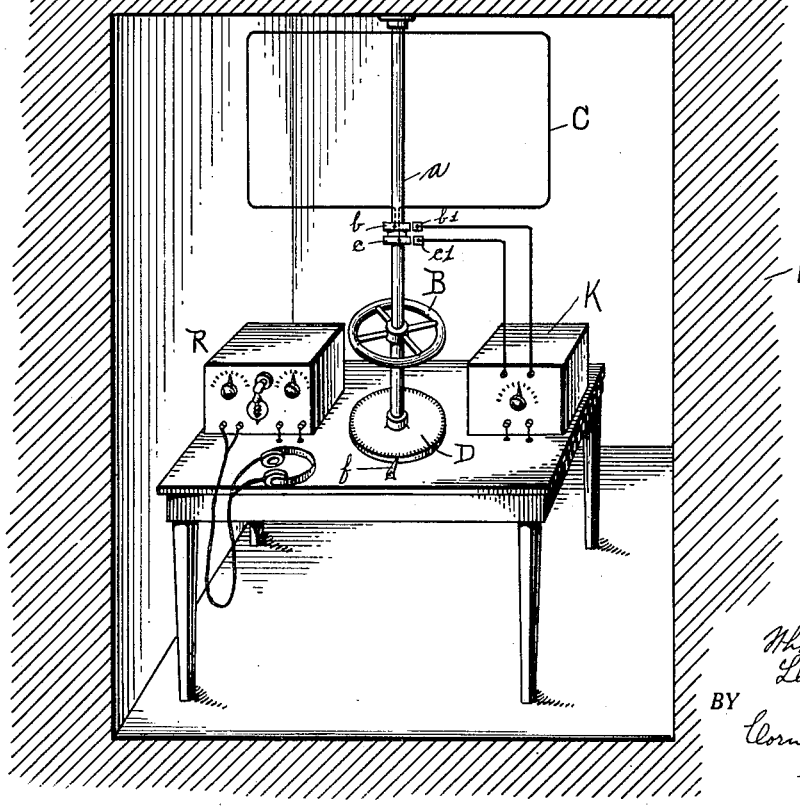
Fig. 8 is a view, partly diagrammatic and partly in perspective, illustrating radiating or absorption structure together with connections thereto and instrumentalities coöperating therewith, all shielded.

While in some of the figures connections from the buried or shielded structure are shown as above the earth or outside of the shielding structure, it is to be understood that these connections and instrumentalities may also be buried or shielded. For example, in the cases of Figs. 1, 2 and 6 the receiving apparatus might be in the same chamber or cavity with the rotatable coil structures. And in connection with immovable shielded or buried structure as in Figs. 3, 4 and 5 the connections therefrom and appurtenant apparatus may be separately shielded, or may be disposed in a chamber or cavity in the earth or similarly shielded. Where the connections are above ground or outside the shielding structures, as diagrammatically indicated in some of the figures, such connections may themselves act somewhat as antennæ, and so tend to produce undesired distortion or effects in the nature of uni-lateral effects. In Fig. 8 is shown an arrangement whereby absorption structure, as rotatable coil C, similar to Fig. 1, together with the connections therefrom and the instrumentalities employed therewith are all shielded. Thus, the connections from the absorption structure C to the condenser K, as well as the receiving instruments R, are shielded. It will be likewise understood that in case the structure C of Fig. 8 transmits or radiates energy, the associated transmitting apparatus may be similarly shielded.

We do not claim as our invention the combination of an antenna structure or path coöperating with a directional structure in transmitting or receiving apparatus for effecting uni-lateral operation, but claim as our invention in such combination the shielding by natural or artificial means, as earth or metallic screening structure, the directional structure of the combination.

For the sake of brevity, in the appended claims we employ the term "radio" as relating to undulatory, impulsive, or vibratory electrical effects transmitted through the natural media.

What we claim is:

1. The combination with radio transmitting or absorption structure comprising a rotary coil, of means for shielding said structure, whereby distortional effects are reduced and the directional characteristic increased.

2. The combination with radio transmitting or absorption structure comprising a coil rotatable about a substantially vertical axis, of means for shielding said structure, whereby distortional effects are reduced and the directional characteristic increased.

3. The combination with radio transmitting or absorption structure comprising a rotary coil, of a natural medium other than air in which said rotary coil is shielded and to or from which said coil directly transmits or receives energy, whereby distortional effects are reduced and the directional characteristic increased.

4. The combination with radio transmitting or absorption structure comprising a coil rotatable about a substantially vertical axis, of a natural medium other than air in which said rotary coil is shielded and to or from which said coil directly transmits or receives energy, whereby distortional effects are reduced and the directional characteristic increased.

5. The combination with radio transmitting or absorption structure comprising a rotary coil, of means for shielding said structure, whereby distortional effects are reduced and the directional characteristic increased, and an unshielded antenna structure coöperating with said coil and independently transmitting or receiving energy.

6. The combination with radio transmitting or absorption structure comprising a coil rotatable about a substantially vertical axis, of means for shielding said structure, whereby distortional effects are reduced and the directional characteristic increased, and an unshielded antenna structure coöperating with said coil and independently transmitting or receiving energy.

7. The combination with radio transmitting or absorption structure comprising a rotary coil, of a natural medium other than air in which said rotary coil is shielded and to or from which said coil directly transmits or absorbs energy, whereby distortional effects are reduced and the directional characteristic increased, and a coöperating antenna structure.

8. The combination with radio transmitting or absorption structure comprising a coil rotatable about a substantially vertical axis, of a natural medium other than air in which said rotary coil is shielded and to or from which said coil directly transmits or absorbs energy, whereby distortional effects are reduced and the directional characteristic increased, and a coöperating antenna structure.

9. Radio receiving apparatus comprising a rotatable coil absorbing energy directly from a natural medium, means for shielding said coil, and variable capacity in circuit with said coil for tuning said circuit to the frequency of the energy absorbed from said natural medium.

10. Radio receiving apparatus comprising an unshielded antenna structure, a coil directly absorbing received energy and co-acting with said antenna structure, a shield for said coil, and variable capacity for tuning the circuit of said coil to the frequency of the received energy.

11. Radio receiving apparatus comprising a stationary unshielded antenna structure, a rotary coil directly absorbing received energy and co-acting with said antenna structure, a shield for said coil, and variable capacity for tuning the circuit of said coil to the frequency of the received energy.

12. Multiplex radio transmitting or receiving structure comprising an antenna structure, and a plurality of shielded coils directly radiating or absorbing energy and co-acting with said antenna structure for either transmitting or receiving.

13. Multiplex radio transmitting or receiving structure comprising an unshielded antenna structure, and a plurality of rotatable shielded coils directly radiating or absorbing energy and co-acting with said antenna structure for either transmitting or receiving.

14. Radio transmitting or receiving apparatus comprising an unshielded antenna structure, a shielded radiating or absorbing structure co-acting therewith for either transmitting or receiving and having an independent oscillation path, and means for separately attuning the oscillation path of said shielded structure.

15. Multiplex radio receiving apparatus comprising an unshielded antenna structure, and a plurality of shielded structures directly absorbing received energy independently of said antenna structure and co-acting with said antenna structure in absorbing received energy, and signal translating means co-acting with each of said shielded structures and said unshielded antenna structure.

16. Multiplex radio receiving apparatus comprising an unshielded antenna structure, and a plurality of shielded coils each directly absorbing received energy and co-acting with said antenna structure in absorbing received energy, and signal translating means co-acting with each of said coils.

17. Multiplex radio receiving apparatus comprising an unshielded antenna structure, and a plurality of shielded structures directly absorbing receiving energy independently of said antenna structure and co-acting with said antenna structure in absorbing received energy, signal translating means co-acting with each of said shielded structures and said unshielded antenna structure, and means for attuning the oscillation paths of said shielded structures to the frequency of received energy.

18. Multiplex radio transmitting or receiving structure comprising an antenna structure, and a plurality of radiating or absorbing structures each adjustable as to its angular position with respect to the distant receiving or transmitting station and independently co-acting with said antenna structure in radiating or absorbing energy.

19. Multiplex radio transmitting or receiving structure comprising an antenna structure, and a plurality of radiating or absorbing rotary coils each independently co-acting with said antenna structure in radiating or absorbing energy.

20. Multiplex radio receiving apparatus comprising an antenna structure, and a plurality of rotatable coils each co-acting independently with said antenna structure in radiating or absorbing energy, and signal translating means co-acting with each of said coils.

21. Radio transmitting or absorbing apparatus comprising an antenna structure, and a shielded rotatable coil directly transmitting or absorbing energy to or from a natural medium and co-acting with said antenna structure.

22. Multiplex radio transmitting or receiving structure comprising an unshielded antenna structure, and a plurality of radiating or absorbing coils each adjustable as to its angular position with respect to the distant receiving or transmitting station and independently co-acting with said antenna structure in radiating or absorbing energy, and means for shielding at least one of said coils.

23. Multiplex radio transmitting or re-receiving structure comprising an antenna structure, and a plurality of rotary coils independently radiating or absorbing energy to or from a natural medium and each independently co-acting with said antenna structure in radiating or absorbing energy, and means for shielding at least one of said coils.

In testimony whereof we have hereunto affixed our signatures this 9th day of June, 1919.

THOMAS APPLEBY.
LLOYD M. KNOLL.